(12) United States Patent
Pang et al.

(10) Patent No.: US 8,185,091 B2
(45) Date of Patent: May 22, 2012

(54) NETWORK ACCESS AUTHENTICATION AND AUTHORIZATION METHOD AND AN AUTHORIZATION KEY UPDATING METHOD

(75) Inventors: Liaojun Pang, Shaanxi (CN); Jun Cao, Shaanxi (CN); Haibo Tian, Shaanxi (CN); Zhenhai Huang, Shaanxi (CN); Bianling Zhang, Shaanxi (CN)

(73) Assignee: China IWNCOMM Co., Ltd. (CN)

( * ) Notice: Subject to any disclaimer, the term of this patent is extended or adjusted under 35 U.S.C. 154(b) by 540 days.

(21) Appl. No.: 12/441,915

(22) PCT Filed: Jul. 16, 2007

(86) PCT No.: PCT/CN2007/070299
§ 371 (c)(1),
(2), (4) Date: Mar. 19, 2009

(87) PCT Pub. No.: WO2008/034360
PCT Pub. Date: Mar. 27, 2008

(65) Prior Publication Data
US 2010/0009656 A1    Jan. 14, 2010

(30) Foreign Application Priority Data
Sep. 23, 2006 (CN) .......................... 2006 1 0104678

(51) Int. Cl.
*H04W 12/08* (2009.01)
(52) U.S. Cl. ........................................ 455/411; 713/169
(58) Field of Classification Search .................. 455/410, 455/411; 713/150, 156, 170, 168, 169
See application file for complete search history.

(56) References Cited

U.S. PATENT DOCUMENTS

| | | | | |
|---|---|---|---|---|
| 7,903,817 B2 * | 3/2011 | Cam-Winget et al. | ........ | 380/270 |
| 7,995,546 B2 * | 8/2011 | Walker et al. | ................. | 370/338 |

(Continued)

FOREIGN PATENT DOCUMENTS

CN       1490973 A       4/2004

OTHER PUBLICATIONS

International Search Report PCT/CN2007/070299; Dated Oct. 25, 2007.

*Primary Examiner* — Kamran Afshar
*Assistant Examiner* — Khawar Iqbal
(74) *Attorney, Agent, or Firm* — Cantor Colburn LLP

(57) ABSTRACT

A network access authentication and authorization method includes the steps of: constructing an access and authorization request packet; constructing a certificate authentication request packet, constructing a certificate authentication response packet; constructing an access and authorization response packet; constructing an access and authorization acknowledgement packet. And an authorization key updating method includes the steps of: constructing an access and authorization request packet; constructing an access and authorization response packet; constructing an access and authorization acknowledgement packet. The invention resolves the security problem that a mobile terminal accesses a base station in the wideband wireless multimedia network, and realizes both bi-directional identity authentication of a mobile terminal and a base station and unidirectional identity authentication from a base station to a mobile terminal. The authorization key negotiation calculation is simple, and the key management is simply realized by using message acknowledgement manner. The invention is applied to the wired network and the wireless network, such as the wireless local area network, the wireless metropolitan area network, and the broadband wireless multimedia network etc.

7 Claims, 1 Drawing Sheet

U.S. PATENT DOCUMENTS

| | | |
|---|---|---|
| 2002/0176583 A1 | 11/2002 | Buttiker |
| 2005/0130659 A1* | 6/2005 | Grech et al. ................. 455/436 |
| 2007/0060106 A1* | 3/2007 | Haverinen et al. ............ 455/410 |
| 2007/0097934 A1* | 5/2007 | Walker et al. ................. 370/338 |
| 2007/0288997 A1* | 12/2007 | Meier et al. ....................... 726/4 |
| 2009/0019284 A1* | 1/2009 | Cho et al. ..................... 713/170 |
| 2011/0055561 A1* | 3/2011 | Lai et al. ...................... 713/168 |

* cited by examiner

NETWORK ACCESS AUTHENTICATION AND AUTHORIZATION METHOD AND AN AUTHORIZATION KEY UPDATING METHOD

The present application claims the priority of Chinese Patent Application No. 200610104678.X, entitled as "NETWORK ACCESS AUTHENTICATION AND AUTHORIZATION METHOD AND AUTHORIZATION KEY UPDATE METHOD", and filed with the Chinese Patent Office on Sep. 23, 2006, the contents of which are incorporated herein by reference in their entireties.

FIELD OF THE INVENTION

The present invention relates to a network access authentication and authorization method and an authorization key update method, which are applicable to wire networks and wireless networks such as wireless local area networks (WLANs), wireless metropolitan area networks (WMANs), and broadband wireless multimedia networks (BWMNs).

BACKGROUND OF THE INVENTION

Security considerations are far more important in wireless networks than in Ethernet. IEEE (Institute of Electrical and Electronics Engineers) has established 802.11 and 802.16 series standards to enhance security in WLANs and WMANs and provided secure access to base stations (BSs) from mobile stations (MSs); China enacted a national standard GB15629.11 for WLANs, usually referred to as WLAN Authentication and Privacy Infrastructure (WAPI) protocol, in May 2003. Data communication and broadcast communication converge in BWMN which is a novel wireless network architecture; likewise, BWMN also faces security problems, such as secure access and authentication and authorization.

IEEE802.11 standard employs Wired Equivalency Privacy (WEP) protocol to achieve security of WLANs; however, from both of theories and applications, severe security vulnerability exists in the WEP protocol. Even if IEEE puts forth 802.11i standard as supplement to eliminate the security vulnerability in WEP, the 802.11i standard can not realize direct identity authentication between mobile stations (MSs) and access points (APs), that is to say, the 802.11i standard only realizes the mutual authentication between mobile stations (MSs) and authentication server units (ASUs), but does not realize direct identity authentication between mobile stations (MSs) and access points (APs); thus, the security has to be enhanced by means of other security protocols. For example, a secure channel has to be established between the access point and ASU by means of other security protocols. A secure channel has to be established between each access point and the background ASU in advance and such a secure channel usually has to be established manually, which is adverse to system expansion. In addition, the reliability of security is poor, i.e., since a secure channel has to be established between each access point and the ASU, the security of the channel will affect the entire network system.

The WMAN standard (i.e., IEEE802.16 standard) put forth by IEEE can solve the problem related to authentication between MSs and BSs, but it can not prevent attackers from disguising themselves as BSs to spoof MSs. Since the authorization key is merely encrypted and protected with the public key of the MS, any one can fake up such packets without being detected.

Though IEEE802.16e standard improves the solution based on the IEEE 802.11i standard, it can not implement direct identity authentication between MSs and BSs yet. Furthermore, a secure channel has to be established in advance between BSs and ASUs by means of other security protocols. Key management employs a time synchronization mechanism, which involves complex state management, i.e., the enabling/disabling of a new key depends on time-based judgement; however, in a distributed system, it is a complex task to maintain the synchronous clock. The system has numerous states and is complex to manage.

Chinese standard GB15629.11 eliminates some defects in the WEP protocol. However, the standard only implements mutual identity authentication between MSs and access points but does not support one-way authentication for MSs by access points, and therefore can not meet the application demand only for the one-way authentication. For example, in BWMN, not only mutual authentication between BSs and MSs but also one-way authentication for MSs by BSs are required. Furthermore, in the key negotiation process, a huge amount of exponential operations have to be carried out, which not only increases the computation load on the devices but also have severe adverse effects on system performance.

SUMMARY OF THE INVENTION

Embodiments of the present invention provide a network access authentication and authorization method and the authorization key update method, which can solve the technical problems in the prior art, i.e., the identity authentication between MSs and BSs can not be accomplished directly but has to be accomplished by means of other security protocols; and only mutual identity authentication between MSs and BSs is available, but one-way identity authentication for MSs by BSs is not supported.

The technical solution in the embodiments of the present invention is:

A network access authentication and authorization method, including:

constructing an access and authorization request packet and sending the access and authorization request packet to a BS, by a MS, when the MS is connected to the BS;

constructing a certificate authentication request packet and sending the certificate authentication request packet to an ASU, by the BS, after the BS receives the access and authorization request packet;

authenticating validity of the MS certificate, or authenticating the validity of the MS certificate and the BS certificate, and constructing a certificate authentication response packet according to the authentication result and sending the certificate authentication response packet to the BS, by the ASU, after the ASU receives the certificate authentication request packet;

constructing an access and authorization response packet, and sending the access and authorization response packet to the MS, by the BS, after the BS receives the certificate authentication response packet; and deriving an authorization key AK with the plain text of an authorization key material AKM that is decrypted with the private key of the MS and random numbers selected by the MS and the BS, deriving a key encryption key and an integrity check key from the authorization key AK, constructing an access and authorization acknowledgement packet, and sending the access and authorization acknowledgement packet to the BS, by the MS, after the MS receives the access and authorization response packet.

Preferably, the contents of the access and authorization request packet include: a Flag field, the MS identifier $ID_{MS}$, a digital certificate $Cert_{MS}$ of the MS, an authorization key identifier AKID, and a random number $N_{MS}$ selected by the MS;

The contents of the certificate authentication request packet include: a Flag field, a digital certificate $Cert_{MS}$ of the MS, a random number $N_{MS}$ selected by the MS and a random number $N_{BS}$ selected by the BS, in which, the value of the Flag field is equal to the value of the Flag field in the access and authorization request packet, the value of the random number $N_{MS}$ selected by the MS is equal to the value of the corresponding field in the access and authorization request packet.

The contents of the certificate authentication response packet include: a Flag field, a digital certificate $Cert_{MS}$ of the MS and an authentication result $Result_{MS}$, a random number $N_{MS}$ selected by the MS, a random number $N_{BS}$ selected by the BS, and a digital signature $Sig_{ASU}$ provided by the ASU for the packet, in which, the value of the Flag field is equal to the value of the Flag field in the certificate authentication request packet, the value of the random number $N_{MS}$ selected by the MS and the value of the random number $N_{BS}$ selected by the BS are equal to the value of the corresponding field in the certificate authentication request, respectively;

The contents of the access and authorization response packet include: a Flag field, a MS identifier $ID_{MS}$, the BS identifier $ID_{BS}$, the digital certificate $Cert_{MS}$ of the MS and an authentication result $Result_{MS}$, a signature $Sig_{ASU}$ provided by the ASU, a series of security associations SAs authorized by the BS for the MS, an authorization key identifier AKID, encrypted text $E_{MS}(AKM)$ of an authorization key material AKM selected by the BS and encrypted with the public key of the MS, the validity period $Life_{AK}$ of the authorization key, a random number $N_{MS}$ selected by the MS and the random number $N_{BS}$ selected by the BS, in which, the value of the Flag field is equal to the value of the Flag field in the access and authorization request packet, and the value of the authorization key identifier AKID is equal to the value of the authorization key identifier AKID in the access and authorization request packet;

The contents of the access and authorization acknowledgement packet include: a Flag field, a MS identifier $ID_{MS}$, the BS identifier $ID_{BS}$, the authorization key identifier AKID, the random number $N_{BS}$ selected by the BS, and a message integrity code MIC, in which, the value of the Flag field is equal to the value of the Flag field in the access and authorization request packet, the value of the random number $N_{BS}$ selected by the BS is equal to the corresponding field in the access and authorization response packet, the message integrity code MIC is calculated with an integrity check key derived from an authorization key AK corresponding to the authorization key identifier AKID, and the authorization key AK is derived from the authorization key material AKM, the random number $N_{MS}$ selected by the MS, and the random number $N_{BS}$ selected by the BS together.

Preferably, if the Flag field indicates one-way authentication, the contents of the certificate authentication request packet further include: encrypted text $E_{MS}(AKM)$ of an authorization key material AKM selected by the BS and encrypted with the public key of the MS; the contents of the certificate authentication response packet further include: encrypted text $E_{MS}(AKM)$ of an authorization key material AKM selected by the BS and encrypted with the public key of the MS.

Preferably, the contents of the access and authorization response packet further include: a message integrity code MIC, which is calculated with an integrity check key derived from an authorization key AK corresponding to the authorization key identifier AKID; the authorization key AK is derived from the authorization key material AKM, the random number $N_{MS}$ selected by the MS, and the random number $N_{BS}$ selected by the BS together.

Preferably, if the Flag field indicates mutual authentication, the contents of the certificate authentication request packet further include: a digital certificate $Cert_{BS}$ provided by the BS and a digital signature $Sig_{BS}$ provided by the BS for all preceding fields; the contents of the certificate authentication response packet further include: a digital certificate $Cert_{BS}$ provided by the BS and an authentication result $Result_{BS}$; the contents of the access and authorization response packet further include: a digital certificate $Cert_{BS}$ provided by the BS and an authentication result $Result_{BS}$, and a digital signature $Sig_{BS}$ provided by the BS.

An authorization key update method associated to the network access authentication and authorization method, including:

constructing an access and authorization request packet, and sending the access and authorization request packet to a BS, by a MS, when an authorization key is to be updated;

constructing an access and authorization response packet based on the last certificate authentication result, and sending the access and authorization response packet to the MS, by the BS, after the BS receives the access and authorization request packet and identifies the request is an authorization key update request by judging the value in the Flag field in the access and authorization request packet; and deriving an authorization key AK with the plain text of an authorization key material AKM that is decrypted with the private key of the MS and random numbers selected by the MS and the BS, deriving a key encryption key and an integrity check key from the authorization key AK, constructing an access and authorization acknowledgement packet, and sending the access and authorization acknowledgement packet to the BS, by the MS, after the MS receives the access and authorization response packet.

Preferably, the contents of the access and authorization request packet include: a Flag field, the MS identifier $ID_{MS}$, an authorization key identifier AKID, a random number $N_{MS}$ selected by the MS, and a message integrity code MIC. The Message integrity code MIC can be used for protecting message integrity, and is calculated with an integrity check key derived from the old authorization key AK;

The contents of the access and authorization response packet include: a Flag field, a MS identifier $ID_{MS}$, a BS identifier $ID_{BS}$, an authorization key identifier AKID, encrypted text $E_{MS}(AKM)$ of an authorization key material AKM that is selected by the BS and encrypted with the public key of the MS, a validity period $Life_{AK}$ of the authorization key, a random number $N_{MS}$ selected by the MS, a random number $N_{BS}$ selected by the BS, and a message integrity code MIC. The value of the Flag field is equal to the value of the Flag field in the access and authorization request packet, the value of the authorization key identifier AKID is equal to the value of the authorization key identifier AKID in the access and authorization request packet, the message integrity code MIC is calculated with an integrity check key that is derived from an authorization key AK corresponding to the authorization key identifier AKID, and the authorization key AK is derived from the authorization key material AKM, the random number $N_{MS}$ selected by the MS, and the random number $N_{BS}$ selected by the BS together.

The embodiments of the present invention traverses the security challenges related to BS access from MS in BWMN; it can implement both mutual identity authentication between MSs and BSs and one-way identity authentication by BS for MS. The embodiments of the present invention further implements direct identity authentication between BSs and MSs; the negotiation and calculation of the authorization key is simple, thus avoiding a huge amount of exponential operations. In the embodiments of the present invention, the key management employs a message acknowledgement approach, which is simple and easy to implement. Moreover, according to the embodiments of the present invention, it is unnecessary to establish a secure channel between BSs and ASUs in advance or utilize any other security protocols.

DETAILED DESCRIPTION OF THE EMBODIMENTS

Hereinafter the technical scheme of the present invention will be described clearly and completely in the embodiments, with reference to the accompanying drawings. Apparently, the embodiments described are only exemplary embodiments of the present invention. Any other embodiments obtained by those skilled in the art on the basis of the embodiments of the present invention without creative labor shall fall into the protection scope of the present invention.

When a MS is connected to a BS, mutual authentication between the MS and the BS or one-way authentication by the BS for the MS is accomplished via an ASU, and the BS authorizes the MS according to the authentication result.

Figure 1:
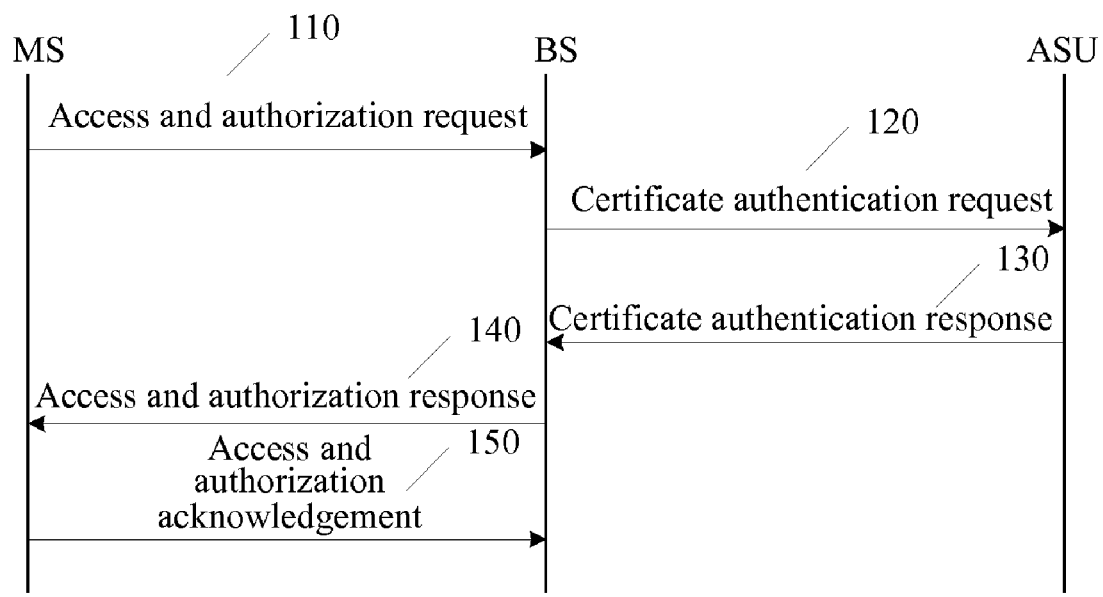
FIG. 1 is a schematic diagram of an access authentication and authorization method according to an embodiment of the present invention.

Refer to FIG. 1, the access authentication and authorization method in the embodiment of present invention includes the steps of:

110. Constructing an access and authorization request packet;

When the MS is connected to the BS, the MS constructs an access and authorization request packet, and sends the access and authorization request packet to the BS.

The contents of the access and authorization request packet include: a Flag field, a MS identifier $ID_{MS}$, a digital certificate $Cert_{MS}$ of the MS, an authorization key identifier AKID, and a random number $N_{MS}$ selected by the MS. Whether the authentication is one-way authentication or mutual authentication can be distinguished with the Flag field.

120. Constructing a certificate authentication request packet;

When receiving the access and authorization request packet from the MS, the BS constructs a certificate authentication request packet, and sends the certificate authentication request packet to an authentication server unit (ASU).

The contents of the certificate authentication request packet include: a Flag field, a digital certificate $Cert_{MS}$ of the MS, a random number $N_{MS}$ selected by the MS, and a random number $N_{BS}$ selected by the BS. The value of the Flag field is equal to the value of the Flag field in the access and authorization request packet, and the value of the random number $N_{MS}$ selected by the MS is equal to the value of the corresponding field in the access and authorization request packet.

If the Flag field indicates one-way authentication, the contents of the certificate authentication request packet further include: encrypted text $E_{MS}(AKM)$ of an authorization key material AKM that is selected by the BS and encrypted with the public key of the MS; and If the Flag field indicates two-way authentication, the contents of the certificate authentication request packet further include: a digital certificate $Cert_{BS}$ of the BS and a digital signature $Sig_{BS}$ provided by the BS for all preceding fields.

130. Constructing a certificate authentication response packet;

When receiving the certificate authentication request packet from the BS, the ASU authenticates the validity of the MS certificate, or authenticates the validity of the MS certificate and the BS certificate. The ASU constructs a certificate authentication response packet according to the authentication result, and sends the certificate authentication response packet to the BS.

The contents of the certificate authentication response packet include: a Flag field, a digital certificate $Cert_{MS}$ of the MS and an authentication result $Result_{MS}$, a random number $N_{MS}$ selected by the MS, a random number $N_{BS}$ selected by the BS, and a digital signature $Sig_{ASU}$ provided by the ASU for the packet. The value of the Flag field is equal to the value of the Flag field in the certificate authentication request packet, and the value of the random number $N_{MS}$ selected by the MS and the value of the random number $N_{BS}$ selected by the BS are equal to the values in corresponding fields in the certificate authentication request, respectively.

If the Flag field indicates one-way authentication, the contents of the certificate authentication response packet further include: encrypted text $E_{MS}(AKM)$ of an authorization key material AKM that is selected by the BS and encrypted with the public key of the MS; and If the Flag field indicates two-way authentication, the contents of the certificate authentication response packet further include a digital certificate $Cert_{BS}$ of the BS and an authentication result $Result_{BS}$.

140. Constructing an access and authorization response packet;

When receiving the certificate authentication response packet from the ASU, the BS constructs an access and authorization response packet, and sends the access and authorization response packet to the MS.

The contents of the access and authorization response packet include: a Flag field, a MS identifier $ID_{MS}$, a BS identifier $ID_{BS}$, a digital certificate $Cert_{MS}$ of the MS and an authentication result $Result_{MS}$, a signature $Sig_{ASU}$ provided by the ASU, a series of security associations SAs authorized by the BS for the MS (including a master SA and a plurality of static SAs), an authorization key identifier AKID, encrypted text $E_{MS}(AKM)$ of an authorization key material (AKM) selected by the BS and encrypted with the public key of the MS, validity period $Life_{AK}$ of the authorization key, a random number $N_{MS}$ selected by the MS, and a random number $N_{BS}$ selected by the BS. The value of Flag field is equal to the value of the Flag field in the access and authorization request packet, and the value of the authorization key identifier AKID is equal to the value of the AKID in the access and authorization request packet.

If the Flag field indicates one-way authentication, the contents of the access and authorization response packet further include a message integrity code MIC. The message integrity code MIC is calculated with an integrity check key derived from the authorization key AK corresponding to the authorization key identifier AKID, and the authorization key AK is derived from the authorization key material AKM, the random number $N_{MS}$ selected by the MS, and the random number $N_{BS}$ selected by the BS together.

If the Flag field indicates two-way authentication, the contents of the access and authorization response packet further include: a digital certificate $Cert_{BS}$ of the BS, an authentication result Result$_{BS}$, and a digital signature Sig$_{BS}$ provided by the BS for all preceding fields.

150. Constructing an access and authorization acknowledgement packet;

When receiving the access and authorization response packet from the BS, the MS derives an authorization key AK from the plain text of the authorization key material AKM that is decrypted with the private key of the MS and the random numbers selected by the MS and the BS, derives a key encryption key and an integrity check key from the authorization key, constructs an access and authorization acknowledgement packet, and sends the access and authorization acknowledgement packet to the BS.

The contents of the access and authorization acknowledgement packet include: a Flag field, a MS identifier ID$_{MS}$, a BS identifier ID$_{BS}$, the authorization key identifier AKID, a random number N$_{BS}$ selected by the BS, and a message integrity code MIC. The value of the Flag field is equal to the value of the Flag field in the access and authorization request packet; the value of the random number selected by the BS is equal to the value of the corresponding field in the access and authorization response packet; the message integrity code MIC is calculated with an integrity check key derived from the authorization key AK corresponding to the authorization key identifier AKID; and the authorization key AK is derived from the authorization key material AKM, the random number N$_{MS}$ selected by the MS, and the random number N$_{BS}$ selected by the BS together.

Figure 2:
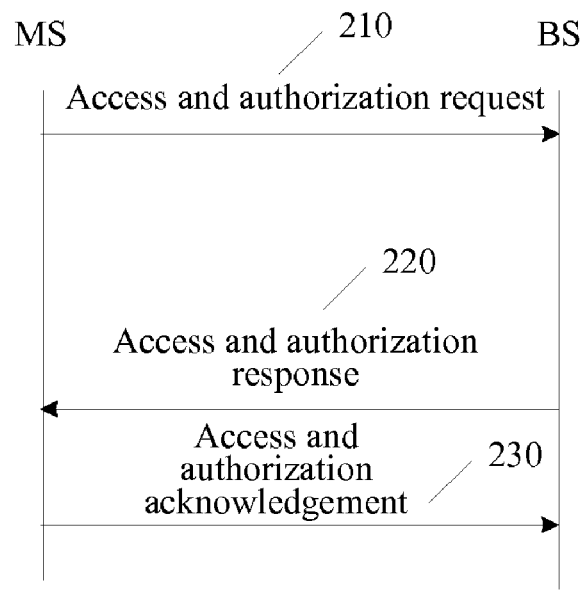
FIG. 2 is a schematic diagram of an authorization key update method according to an embodiment of the present invention.

As shown in FIG. 2, the authorization key update method provided in the embodiment of the present invention includes the steps of:

210. Constructing an access and authorization request packet;

To update the authorization key, the MS constructs an access and authorization request packet, and sends the access and authorization request packet to the BS.

The contents of the access and authorization request packet include: a Flag field, a MS identifier ID$_{MS}$, an authorization key identifier AKID, a random number N$_{MS}$ selected by the MS, and a message integrity code MIC. The message integrity code MIC can be used to protect message integrity, and is calculated with an integrity check key derived from the old authorization key AK.

220. Constructing an access and authorization response packet;

When receiving the access and authorization request packet from the BS, the BS judges whether the request is an authorization key update request based on the Flag field in the packet; if the request is judged as an authorization key update request, the BS constructs an access and authorization response packet according to the last certificate authentication result, and sends the access and authorization response packet to the MS;

The contents of the access and authorization response packet include: a Flag field, a MS identifier ID$_{MS}$, a BS identifier ID$_{BS}$, an authorization key identifier AKID, encrypted text E$_{MS}$(AKM) of an authorization key material AKM that is selected by the BS and encrypted with the public key of the MS, validity period Life$_{AK}$ of the authorization key, a random number N$_{MS}$ selected by the MS, a random number N$_{BS}$ selected by the BS and a message integrity code MIC. The value of the Flag field is equal to the value of the Flag field in the access and authorization request packet; the value of the authorization key identifier AKID is equal to the value of the AKID in the access and authorization request packet; the message integrity code MIC is calculated with an integrity check key derived from the authorization key AK corresponding to the authorization key identifier AKID; and the authorization key AK is derived from the authorization key material AKM, the random number N$_{MS}$ selected by the MS, and the random number N$_{BS}$ selected by the BS together.

230. Constructing an access and authorization acknowledgement packet;

When receiving the access and authorization response packet from the BS, the MS derives an authorization key AK from the plain text of the authorization key material AKM that is decrypted with the private key of the MS and the random numbers selected by the MS and the BS, derives a key encryption key and an integrity check key from the authorization key AK, constructs an access and authorization acknowledgement packet, and sends the access and authorization acknowledgement packet to the BS.

The network access authentication and authorization method provided in the embodiment of the present invention supports authorization key update. A bit in the Flag field can be used to identify whether it is an initial access authentication and authorization process or an authorization key update process.

The key can be updated with the initial access authentication and authorization method or the authorization key update method.

When the MS is connected to the BS initially, the key can be updated only with the initial access authentication and authorization method. The security of the authorization key update method and the system performance is higher.

The embodiments of the present invention have the following advantages of:

(1) solving the security problems related to MSs access to a BSs in BWMN;

(2) supporting mutual identity authentication between MSs and BSs as well as one-way identity authentication by BSs for MSs;

(3) implementing direct identity authentication between BSs and MSs;

(4) the authorization key negotiation and calculation being simple, and therefore avoiding a huge amount of exponential operations;

(5) The key management employing a message acknowledgement approach, which is simple and easy to implement, without establishing a secure channel between BSs and authentication server units (ASUs) or utilizing any other security protocols.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

What is claimed is:

1. A network access authentication and authorization method comprising:

constructing an access and authorization request packet and sending the access and authorization request packet to a base station, BS, by a mobile station, MS, when the MS is connected to the BS;

constructing a certificate authentication request packet and sending the certificate authentication request packet to an authentication server unit, ASU, by the BS, after the BS receives the access and authorization request packet;

authenticating validity of a MS certificate, or authenticating validity of the MS certificate and a BS certificate, and constructing a certificate authentication response packet according to an authentication result and sending the certificate authentication response packet to the BS, by the ASU, after the ASU receives the certificate authentication request packet;

constructing an access and authorization response packet that includes encrypted text $E_{ms}$ (AKM) of an authorization key material AKM selected by the BS and encrypted with a public key of the MS, and sending the access and authorization response packet to the MS, by the BS, after the BS receives the certificate authentication response packet; and deriving an authorization key AK with a plain text of an authorization key material AKM that is decrypted with a private key of the MS and random numbers selected by the MS and the BS, deriving a key encryption key and an integrity check key from the authorization key AK, constructing an access and authorization acknowledgement packet that includes a message integrity code MIC calculated with the derived integrity check key, and sending the access and authorization acknowledgement packet to the BS, by the MS, after the MS receives the access and authorization response packet.

2. The network access authentication and authorization method according to claim 1, wherein:

contents of the access and authorization request packet comprises: a Flag field, a MS identifier $ID_{MS}$, a digital certificate $Cert_{MS}$ of the MS, an authorization key identifier AKID, and a random number $N_{MS}$ selected by the MS;

contents of the certificate authentication request packet comprise: a Flag field, a digital certificate $Cert_{MS}$ of the MS, a random number $N_{MS}$ selected by the MS, and a random number $N_{BS}$ selected by the BS;

contents of the certificate authentication response packet comprise: a Flag field, a digital certificate $Cert_{MS}$ of the MS and an authentication result $Result_{MS}$, a random number $N_{MS}$ selected by the MS, a random number $N_{BS}$ selected by the BS, and a digital signature $Sig_{Asu}$ provided by the ASU for the packet;

contents of the access and authorization response packet comprise: a Flag field, a MS identifier $ID_{MS}$, a BS identifier $ID_{BS}$, a digital certificate $Cert_{MS}$ of the MS and an authentication result $Result_{MS}$, a signature $Sig_{Asu}$ provided by the ASU, a series of security associations SAs authorized by the BS for the MS, an authorization key identifier AKID, encrypted text $E_{MS}$(AKM) of an authorization key material AKM selected by the BS and encrypted with a public key of the MS, validity period $Life_{AK}$ of the authorization key, a random number $N_{MS}$ selected by the MS, and a random number $N_{BS}$ selected by the BS; and contents of the access and authorization acknowledgement packet comprise: a Flag field, a MS identifier $ID_{MS}$, a BS identifier $ID_{BS}$, an authorization key identifier AKID, a random number $N_{BS}$ selected by the BS, and a message integrity code MIC.

3. The network access authentication and authorization method according to claim 2, wherein if the Flag field indicates one-way authentication, the contents of the certificate authentication request packet further comprise: encrypted text $E_{MS}$(AKM) of an authorization key material AKM that is selected by the BS and encrypted with the public key of the MS; and the contents of the certificate authentication response packet further comprise:

encrypted text $E_{MS}$(AKM) of an authorization key material AKM selected by the BS and encrypted with the public key of the MS.

4. The network access authentication and authorization method according to claim 3, wherein the contents of the access and authorization response packet further comprise: a message integrity code MIC, which is calculated with an integrity check key derived from an authorization key AK corresponding to the authorization key identifier AKID; the authorization key AK is derived from the authorization key material AKM, the random number $N_{MS}$ selected by the MS, and the random number $N_{BS}$ selected by the BS together.

5. The network access authentication and authorization method according to claim 2, wherein if the Flag field indicates mutual authentication:

the contents of the certificate authentication request packet further comprise: a digital certificate $Cert_{BS}$ of the BS and a digital signature $Sig_{BS}$ provided by the BS for all preceding fields;

the contents of the certificate authentication response packet further comprise: a digital certificate $Cert_{BS}$ of the BS and an authentication result $Result_{BS}$; and the contents of the access and authorization response packet further comprise: a digital certificate $Cert_{BS}$ of the BS and an authentication result $Result_{BS}$, and a digital signature $Sig_{BS}$ provided by the BS.

6. An authorization key update method associated to the network access authentication and authorization method according to claim 1, wherein the authorization key update method comprises:

constructing an access and authorization request packet, and sending the access and authorization request packet to the BS, by the MS, when the authorization key is to be updated;

constructing an access and authorization response packet that includes encrypted text $E_{MS}$ (AKM) of an authorization key material AKM selected by the BS and encrypted with a public key of the MS, and sending the access and authorization response packet to the MS, by the BS, after the BS receives the access and authorization request packet and determines the request packet is an authorization key update request based on a value in a Flag field in the access and authorization request packet; and deriving an authorization key AK with the plain text of an authorization key material AKM that is decrypted with the private key of the MS and random numbers selected by the MS and the BS, deriving a key encryption key and an integrity check key from the authorization key AK, constructing an access and authorization acknowledgement packet that includes a message integrity code MIC calculated with the derived integrity check key, and sending the access and authorization acknowledgement packet to the BS, by the MS, after the MS receives the access and authorization response packet.

7. The authorization key update method according to claim 6, wherein:

contents of the access and authorization request packet comprise: a Flag field, a MS identifier $ID_{MS}$, an authorization key identifier AKID, a random number $N_{MS}$ selected by the MS, and a message integrity code MIC; the MIC is used to prevent message integrity, and is calculated with an integrity check key derived from an old authorization key AK; and contents of the access and authorization response packet comprise: a Flag field, a MS identifier $ID_{MS}$, a BS identifier $ID_{BS}$, an authorization key identifier AKID, encrypted text $E_{ms}$(AKM) of the authorization key material AKM that is selected by the BS and encrypted with the public key of the MS, validity period $Life_{AK}$ of the authorization key, a random number $N_{MS}$ selected by the MS, a random number $N_{BS}$ selected by the BS, and a message integrity code MIC; the message integrity code MIC is calculated with an integrity check key derived from an authorization key AK corresponding to the authorization key identifier AKID, and the authorization key AK is derived from the authorization key material AKM, the random number $N_{MS}$ selected by the MS, and the random number $N_{BS}$ selected by the BS together.

* * * * *